3,004,983
4-AMINOPYRAZOLO[3,4-a]INDENE
DERIVATIVES
Bernard Loev, Broomall, Pa., assignor to Smith Kline & French Laboratories, Philadelphia, Pa., a corporation of Pennsylvania
No Drawing. Filed May 16, 1960, Ser. No. 29,147
4 Claims. (Cl. 260—310)

This invention relates to novel 4-aminopyrazolo-[3,4-a]indene derivatives which are useful as therapeutic agents. This invention particularly relates to novel 3-substituted-4-amino-1,4-dihydropyrazolo[3,4-a]indenes.

The amino compound of this invention have hypotensive activity and in addition have useful central nervous system depressant activity.

This invention also relates to the novel 4-formamido-1,4-dihydropyrazolo[3,4-a]indenes which are useful as intermediates in the preparation of the 4-amino compounds of this invention. In addition the said formamido compounds have hypotensive activity.

The novel 4-amino-1,4-dihydropyrazolo[3,4-a]indenes of this invention are represented by the following structural formula:

FORMULA I

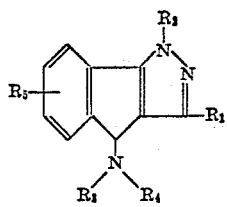

when:

$R_1$ represents alkyl having 1 to 6 carbon atoms inclusive, alkenyl having 2 to 6 carbon atoms inclusive, cycloalkyl having 3 to 6 carbon atoms inclusive, cycloalkenyl having 4 to 6 carbon atoms inclusive, phenyl or substituted phenyl such as aminophenyl, halophenyl, lower alkylphenyl or lower alkoxyphenyl;

$R_2$ represents hydrogen, lower alkyl or acyl;

$R_3$ and $R_4$ represent hydrogen, lower alkyl or acyl; and $R_5$ represents hydrogen, halogen, trifluoromethyl, lower alkyl, lower alkoxy, hydroxy, nitro and amino.

Preferred compounds of this invention are represented by the following structural formula:

FORMULA II

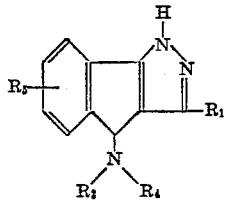

when:

$R_1$ represents alkyl having 1 to 5 carbon atoms inclusive, alkenyl having 2 to 5 carbon atoms inclusive or cycloalkyl having 3 to 6 carbon atoms inclusive;

$R_3$ and $R_4$ represent hydrogen or methyl; and $R_5$ represents hydrogen, chloro or trifluoromethyl.

The terms "lower alkyl" and "lower alkoxy" are used herein to indicate moieties having not more than 4 carbon atoms, preferably 1 or 2 carbon atoms. The term "acyl" is used herein to indicate moieties having less than 9 carbon atoms such as benzoyl, benzenesulfonyl, lower alkanoyl, for example acetyl or propionyl, or alkyloxycarbonyl, for example carbethoxy, carbomethoxy, or carbamoyl.

This invention also includes acid addition salts of the above defined bases formed with organic and inorganic acids. Pharmaceutically acceptable, nontoxic salts formed with nontoxic organic and inorganic acids are particularly advantageous when the compounds of this invention are to be used as therapeutic agents. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well known to the art.

The 4-amino-1,4-dihydropyrazolo[3,4-a]indenes of this invention are prepared by the following procedure:

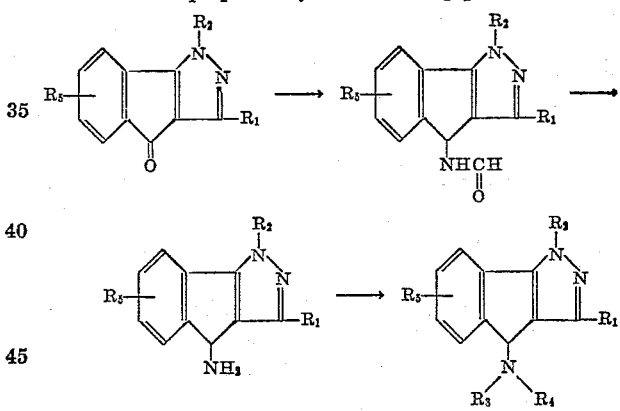

According to this procedure a pyrazolo[3,4-a]-inden-4(1H)-one is reacted with excess formamide at elevated temperature, conveniently at reflux temperature for about 10 to 60 minutes. Cooling and filtering yields the 4-formamido-1,4-dihydropyrazolo[3,4-a]indene. The formamido group is hydrolyzed by heating, conveniently at reflux with a mineral acid such as sulfuric or, preferably, hydrochloric acid for a period of about two to eight hours. The mixture is made basic preferably with an alkali metal hydroxide such as sodium or potassium hydroxide to separate the 4-amino-1,4-dihydropyrazolo[3,4-a]indenes of this invention.

Alkylation of the amino group to prepare further compounds of this invention is accomplished in several ways. Monoalkylation is carried out by reacting the primary amino compound with one molar equivalent of an alkyl halide in an organic solvent such as dimethylformamide, conveniently in the presence of an alkali metal carbonate such as potassium or sodium carbonate. Dialkylation is accomplished by the same procedure using at least two molar equivalents of the alkyl halide.

Alternatively monoalkylation is carried out by reacting the primary amino compound with an appropriate aldehyde or ketone in a lower alcohol solvent and catalytically reducing the resulting Schiff base with a catalyst such as palladium-on-charcoal or platinum oxide.

Reduction of the 4-formamido-1,4-dihydropyrazolo[3,4-a]indene intermediates with a bimetallic hydride such as lithium aluminum hydride or sodium aluminium hydride in ether solution such as ethyl ether or tetrahydrofuran gives the monomethylamino compounds of this invention. The dimethylamino compounds are prepared by treating either the primary amine or the monomethylamino compound with a mixture of aqueous formaldehyde and formic acid.

Acylation of the amino group is accomplished by reacting the primary or secondary amino compound with at least one molar equivalent of an appropriate acyl halide, conveniently in the presence of an alkali metal carbonate such as sodium or potassium carbonate.

The 3-substituted-pyrazolo[3,4-a]inden-4(1H)-one starting materials are prepared as described in the copending applications Serial No. 848,927, filed October 27, 1959 and Serial No. 851,262, filed November 6, 1959, of which I am an inventor. Briefly these compounds are prepared from 2-acyl-1,3-indandiones, which are either known to the art or are conveniently prepared by condensation of a methyl ketone with a dimethyl or diethyl phthalate frequently in an aromatic solvent such as benzene or toluene with an alkaline condensing agent such as sodium methoxide, sodium ethoxide, sodium hydride or sodium hydroxide. These 2-acyl-1,3-indandiones are reacted with substantially molar equivalent quantities of hydrazine at elevated temperature, such as from about 40° C. to 130° C. for a reaction period of from about 30 minutes to 24 hours in a solvent in which the reactants are substantially soluble and with which no chemical reaction occurs, preferably a lower alcohol such as methanol or ethanol, to give the 3-substituted-pyrazolo[3,4-a]inden-4(1H)-one intermediates.

When a compound in which $R_2$ of Formula I is lower alkyl is desired, the 3-substituted-pyrazolo[3,4-a]inden-4(1H)-one intermediate is reacted with a basic reagent, preferably an alkali metal or its hydroxide, amide, carbonate or hydride to form the N-metal salt, for instance the preferred sodium, potassium or lithium derivative at the 1-position. This N-metal derivative is then reacted with a reactive alkyl halide to give the 1-alkyl intermediates.

Compounds in which $R_2$ of Formula I is acyl are prepared by forming an N-alkali metal salt at the 1-position of 4-amino-1,4-dihydropyrazolo[3,4-a]indene and reacting this salt with the appropriate acyl halide.

When 2-acyl-1,3-indandione compounds unsymmetrically substituted in the benzene ring are cyclized as described above, varying amounts of the two possible isomers are obtained. These isomers are separated by fractional crystallization of salts of the 4-aminopyrazolo[3,4-a]indenes in a suitable solvent such as a lower alkyl alcohol for example ethanol or isopropanol.

It will be apparent to one skilled in the art that many variations of this invention can be practical. The following examples are designed to teach fully the preparation of the compounds of this invention and are not meant to limit the scope of this invention.

Example 1

A mixture of 97.0 g. of dimethyl phthalate, 36.0 g. of methyl ethyl ketone, 28.5 g. of sodium methoxide and 300 ml. of toluene is heated at 100° C. for ten hours. Concentrating, dissolving the residue in water, acidifying the aqueous solution with concentrated hydrochloric acid and extracting with ether gives, after evaporation of the extract, 2-propionyl-1,3-indandione.

Hydrazine (3.2 g.) and 20.2 g. of 2-propionyl-1,3-indandione in 400 ml. of ethanol is heated at reflux for two hours. Dilution with cold water separates 3-ethylpyrazolo[3,4-a]inden-4(1H)-one.

Four grams of 3-ethylpyrazolo[3,4-a]inden-4(1H)-one is suspended in 50 ml. of formamide and heated at reflux for 30 minutes. Cooling and filtering gives 3-ethyl-4-formamido-1,4-dihydropyrazolo[3,4-a]indene. After recrystallization from methanol the compound melts at 267–8° C.

A mixture of 2.0 g. of 3-ethyl-4-formamido-1,4-dihydropyrazolo[3,4-a]indene and 50 ml. of 3:1 hydrochloric acid is refluxed for five hours. After making basic with sodium hydroxide, the oil which separates and gradually crystallizes is 4-amino-3-ethyl-1,4-dihydropyrazolo[3,4-a]indene.

This amine is dissolved in anhydrous ethanol and treated with an excess of ethereal hydrogen bromide. Dilution with ether and filtration gives the dihydrobromide salt, M.P. 245–250° C.

Example 2

A tetrahydrofuran solution of 7.4 g. of 3-ethyl-4-formamido-1,4-dihydropyrazolo[3,4-a]indene, prepared as in Example 1, added to 12.0 g. of lithium aluminum hydride in tetrahydrofuran. The mixture is refluxed for ten hours, diluted with ether and with water. The organic layer is separated, filtered and concentrated to give 3-ethyl-1,4-dihydro-4-methylaminopyrazolo[3,4-a]indene as the residue. Treatment of this amine with excess ethereal hydrogen chloride gives 3-ethyl-1,4-dihydro-4-methylaminopyrazolo[3,4-a]indene dihydrochloride, M.P. 226–8° C.

Example 3

A mixture of 5.6 g. of 3-ethyl-1,4-dihydro-4-methylaminopyrazolo[3,4-a]indene (prepared as in Example 2), 6.0 g. of formic acid and 40 ml. of methanol is treated with 4.3 ml. of 35% formaldehyde. The resulting solution is refluxed for 24 hours. Concentration leaves an oil which is dissolved in water. The aqueous solution is washed with ethyl acetate. The aqueous solution is neutralized with 10% sodium hydroxide and extracted with ethyl acetate. Concentration of the extracts leaves 3-ethyl-1,4-dihydro-4-dimethylaminopyrazolo[3,4-a]indene as an oil.

An ether solution of the above prepared amine is treated with an excess of ethereal hydrogen chloride to give the hydrochloride salt as a hemihydrate.

Example 4

A mixture of 97.0 g. of dimethyl phthalate and 43.0 g. of 3-methyl-2-butanone is treated with 28.5 g. of sodium methoxide. After adding 300 ml. of toluene the mixture is heated on a steam bath for ten hours. Evaporating the volatiles in vacuo, dissolving the residue in water, acidifying the aqueous solution with concentrated hydrochloric acid and extracting with ether gives, upon evaporation of the ether extracts, 2-isobutyryl-1,3-indandione.

Hydrazine hydrate (10.0 g.) and 2-isobutyryl-1,3-indandione (43.2 g.) are refluxed for four hours in 400 ml. of ethanol. The solution is cooled and diluted with 1 l. of cold water. The resulting solid is separated to give 3-isopropylpyrazolo[3,4-a]inden-4(1H)-one.

A mixture of 2.0 g. of 3-isopropylpyrazolo-[3,4-a]inden-4(1H)-one and 25 ml. of formamide is refluxed for 30 minutes. Cooling and filtering gives 4-formamido-3-isopropyl-1,4-dihydropyrazolo[3,4-a]indene. This formamido compound is refluxed with 3:1 hydrochloric acid for five hours. Working up as in Example 1 gives 4-amino-1,4-dihydro-3-isopropylpyrazolo[3,4-a]indene.

A mixture of 1.5 g. of 4-amino-1,4-dihydro-3-isopropylpyrazolo[3,4-a]indene, 5 ml. of formic acid, 2.5 ml. of formaldehyde and 30 ml. of methanol is refluxed for 18 hours. Concentrating, dissolving the residue in water, washing with ethyl acetate, neutralizing, extracting with ethyl acetate and concentrating the extracts gives 1,4-dihydro-3-isopropyl-4-dimethylaminopyrazolo-[3,4-a]indene.

Example 5

A mixture of 6.0 g. of 2-pivalyl-5-trifluoromethyl-1,3-indandione (made by condensing pinacolone and dimethyl 4-trifluoromethylphthalate) and 1.1 g. of hydrazine hydrate in 100 ml. of ethanol is refluxed for two hours. The solution is cooled and diluted with cold water. The resulting solid is a mixture of isomers, 3-t-butyl-7-trifluoromethylpyrazolo[3,4-a]inden-4 - (1H)-one and 3 - t-butyl-6-trifluoromethylpyrazolo[3,4-a]inden-4-(1H)-one.

These isomers (2.0 g.) are refluxed with 30 ml. of formamide for 40 minutes to give, after cooling and filtering, a mixture of 3-t-butyl-4-formamido-7(and 6)-trifluoromethylpyrazolo[3,4 -a]indene. Refluxing these formamido compounds with 3:1 hydrochloric acid for four hours, then basifying and removing the aqueous layer gives a mixture of 4-amino-3-t-butyl-1,4-dihydro-7-(and 6)-trifluoromethylpyrazolo[3,4-a]indene.

An ethyl acetate solution of the above prepared amine isomers is treated with a molar equivalent of maleic acid to give upon concentration and cooling a mixture of the maleate salts which are fractionally crystallized from ethanol to separate 4-amino-3-t-butyl-1,4-dihydro-7-trifluoromethylpyrazolo[3,4-a]indene maleate and the corresponding 6-trifluoromethyl isomer.

The separated free bases are obtained by dissolving the maleate salt in water, neutralizing with sodium carbonate, extracting with ether and concentrating the extracts.

A mixture of 1.0 g. of 4-amino-3-t-butyl-1,4-dihydro-7-trifluoromethylpyrazolo[3,4-a]indene, 2.0 g. of formic acid, 1.5 g. of formaldehyde and 25 ml. of methanol is refluxed for 20 hours. Working up as in Example 4 gives 3 - t-butyl-1,4-dihydro-4-dimethylamino-7-trifluoromethylpyrazolo[3,4-a]pyrazolo[3,4-a]indene.

Example 6

To a mixture of 97 g. of dimethylpthalate, 150 ml. of ligroin and 70 ml. of toluene is added 28.5 g. of sodium methoxide. A solution of 42 g. of cyclopropyl methyl ketone in 66 ml. of ligroin and 33 ml. of toluene is added dropwise while azeotropically separating methanol. The mixture is cooled and the solid sodium salt is separated. Dissolving the sodium salt in water, acidifying with concentrated hydrochloric acid and filtering and recrystallizing the solid from aqueous ethanol gives 2-cyclopropylcarbonyl-1,3-indandione, M.P. 130–132° C.

A mixture of 21.4 g. of the indandione, 5.0 g. of hydrazine hydrate and 250 ml. of ethanol is refluxed for 24 hours. Cooling, adding water, filtering and recrystallizing the resulting solid from aqueous ethanol gives 3-cyclopropylpyrazolo[3,4 - a]inden - 4(1H) - one, M.P. 212 – 219° C.

Eight grams of 3-cyclopropylpyrazolo[3,4-a]inden-4(1H)-one and 100 ml. of formamide are heated at reflux for 30 minutes. Cooling separates 3-cyclopropyl-4-formamido-1,2 - dihydropyrazolo[3,4 - a]indene. Refluxing this formamido with hydrochloric acid for five hours, basifying and removing the aqueous layer gives 4-amino-3-cyclopropyl-1,4-dihydropyrazolo[3,4-a]indene.

Example 7

A mixture of 3.5 g. of 4-amino-3-cyclopropyl-1, 4-dihydropyrazolo[3,4-a]indene, prepared as in Example 6, and 20 ml. of 10% sodium hydroxide is warmed for three minutes. The resulting sodium salt is treated with one equivalent of ethyl chloroformate in 10 ml. of ethanol, then warmed at 60° C. for one hour. The resulting 4-amino-1-carbethoxy-3-cyclopropyl-1,4-dihydropyrazolo[3,4-a]-indene, is isolated by extraction with ether and evaporation of the organic layer.

In a similar fashion a mixture of 2.3 g. of the sodium salt prepared above and 1.0 g. of methyl chloroformate in 25 ml. of ethanol is refluxed for 15 minutes. Extraction with ether and evaporation of the extracts gives 4-amino-1-carbomethoxy-3-cyclopropyl - 1,4 - dihydropyrazolo[3,4-a]indene.

Example 8

A mixture of 2.5 g. of 3-cyclopropylpyrazolo[3,4-a]inden-4(1H)-one, made as in Example 6, and 75 ml. of 10% aqueous sodium hydroxide is warmed very briefly, then concentrated to a small volume. The sodium salt is isolated by filtration. A mixture of 1.5 g. of this salt and 5.0 g. of methyl iodide in 25 ml. of ethanol is heated at reflux for 5 hours. The volatiles are removed to leave 3-cyclopropyl-1-methylpyrazolo[3,4-a]-inden-4(1H)-one.

A mixture of 2.0 g. of 3-cyclopropyl-1-methylpyrazolo-[3,4-a]inden-4(1H)-one and 30 ml. of formamide is refluxed for 45 minutes. Cooling and filtering gives 3-cyclopropyl-4-formamido-1,4-dihydro - 1 - methylpyrazolo[3,4-a]indene. This formamido is refluxed with 3:1 hydrochloric acid for five hours to give after making the solution basic with sodium hydroxide 4-amino-3-cyclopropyl-1,4-dihydro-1-methylpyrazolo[3,4-a]indene.

Similarly the sodium salt (1.0 g.) prepared above is reacted with 8.0 g. of butyl bromide in ethanol solution to give 1-butyl-3-cyclopropylpyrazolo[3,4-a]inden-4(1H)-one. This ketone is refluxed with 15 ml. of formamide for 20 minutes to give, after cooling and filtering, 1-butyl-3-cyclopropyl-4-formamido-1,4 - dihydropyrazolo[3,4-a]-indene. Refluxing this formamido compound with 3:1 hydrochloric acid for five hours and neutralizing with sodium hydroxide gives 4-amino-1-butyl-3-cyclopropyl-1,4-dihydropyrazolo[3,4-a]indene.

Example 9

A solution of 5.1 g. of 2-cyclohexylcarbonyl-1,3-indandione and 0.65 g. of hydrazine in 250 ml. of methanol is refluxed for 14 hours to give 3-cyclohexylpyrazolo-[3,4-a]inden-4(1H)-one.

This ketone (4.0 g.) is refluxed with 50 ml. of formamide for 30 minutes to give upon cooling and filtering 3-cyclohexyl-4-formamido - 1,4 - dihydropyrazolo[3,4-a]indene.

A mixture of 1.0 g. of 3-cyclohexyl-4-formamido-1,4-dihydropyrazolo[3,4-a]indene and 30 ml. of 3:1 hydrochloric acid is refluxed for four hours to give after basifying and removing the aqueous solution 4-amino-3-cyclohexyl-1,4-dihydropyrazolo[3,4-a]indene.

A solution of 1.0 g. of this free base in ethyl acetate is added to an ethanol solution of mandelic acid. Concentration and cooling gives the mandelate salt.

Example 10

A mixture of 2.5 g. of 2-(1-cyclopenten-1-yl-carbonyl)-5-methyl-1,3-indandione, prepared by condensing diethyl 4-methyl phthalate with 1-cyclopenten-1-yl methyl ketone, and 0.5 g. of hydrazine hydrate in 200 ml. of methanol is heated at reflux for 48 hours. The resulting solid is a mixture of 3-(1-cyclopenten-1-yl)-6(and 7)-methylpyrazolo[3,4-a]inden-4(1H)-one.

Refluxing this mixture of isomers with 25 ml. of formamide for 30 minutes, then cooling and filtering furnishes 3 - (1 - cyclopenten-1-yl)-4-formamido-1,2-dihydro-6(and 7)-methylpyrazolo[3,4-a]indene.

This mixture of isomers is refluxed with 15 ml. of 3:1 hydrochloric acid for five hours. After basifying, the aqueous layer is removed to leave a mixture of 4-amino-3-(1-cyclopenten-1-yl)-1,2-dihydro-6(and 7)-methylpyrazolo-[3,4-a]indene.

An ethanol solution of the free bases is treated with excess ethereal hydrogen chloride to separate the hydrochloride salts which are fractionally crystallized from ethanol to give 4-amino-3-(1-cyclopenten-1-yl)-1,2-dihydro-6-methylpyrazolo[3,4-a]indene hydrochloride and its 7-methyl isomer.

The free bases are obtained by dissolving the salts in water, neutralizing, extracting with ether and evaporating the extracts.

Example 11

A mixture of 2.6 g. of 2-(1,3-cyclohexadien-1-yl-carbonyl)-5-hydroxy-1,3-indandione (prepared by condensing 1,3-cyclohexadien-1-yl methyl ketone with dimethyl 4-acetoxyphthalate and hydrolyzing the O-acetyl group with 15% hydrochloric acid) and 0.5 g. of hydrazine hydrate in 150 ml. of ethanol is refluxed for 20 hours to give, after quenching with cold water, a mixture of 3-(1,3-cyclohexadienyl) - 6 - hydroxypyrazolo[3,4-a]inden-4-(1H)-one and the corresponding 7-hydroxy compound.

These ketones are refluxed with 25 ml. of formamide for 45 minutes. After cooling, a mixture of 3-(1,3-cyclohexadienyl)-4-formamido-1,4-dihydro-6(and 7)-hydroxypyrazolo[3,4-a]indene is filtered off.

Refluxing these formamido compounds with 20 ml. of 3:1 hydrochloric acid for five hours, then basifying and removing the aqueous layer yields 4-amino-3-(1,3-cyclohexadienyl)-1,4-dihydro-6(and 7)-hydroxypyrazolo-[3,4-a]indene.

The isomers are separated by dissolving in acetone, treating with a molar equivalent of citric acid in acetone, concentrating and filtering to give a mixture of the citrate salts and fractionally crystallizing the salts from ethanol.

Example 12

A solution of 3.1 g. of 2-acetyl-5-iodo-1,3-indandione (prepared by condensing dimethyl 4-iodophthalate with acetone) and 0.5 g. of hydrazine hydrate in ethanol is heated at reflux for one hour. Quenching the reaction mixture gives a mixture of 6(and 7)-iodo-3-methylpyrazolo]3,4-a]inden-4(1H)-one.

Refluxing the above prepared indenones with 25 ml. of formamide for 30 minutes yields 4-formamido-1,4-dihydro-6(and 7)-iodo-3-methylpyrazolo[3,4-a]indene.

A mixture of 2.0 g. of 4-formamido-1,4-dihydro-6(and 7)-iodo-3-methylpyrazolo[3,4-a]indene and 35 ml. of 3:1 hydrochloric acid is refluxed for five hours and worked up as in Example 11 to give 4-amino-1,4-dihydro-6(and 7)-iodo-3-methylpyrazolo[3,4-a]indene.

These isomers are separated by converting the free bases to the citrate salts and fractionally crystallizing these salts from ethanol.

Example 13

A mixture of 4.0 g. of 3-n-hexylpyrazolo[3,4-a]inden-4(1H)-one (prepared by condensing dimethyl phthalate with 2-octanone and reacting the resulting 2-n-heptanoyl-1,3-indandione with one equivalent of hydrazine) and 50 ml. of formamide is heated at reflux for 30 minutes. Cooling and filtering gives 4-formamido-3-n-hexyl-1,4-dihydropyrazolo[3,4-a]indene which is refluxed with 25 ml. of 3:1 hydrochloric acid for five hours. Sodium hydroxide solution is added until the mixture is basic. Removal of the water layer leaves 4-amino-3-n-hexyl-1,4-dihydropyrazolo[3,4-a]indene.

A mixture of 2.4 g. of 4-amino-3-n-hexyl-1,4-dihydropyrazolo[3,4-a]indene, 3.0 g. of n-butyl bromide 5.0 g. of potassium carbonate and 60 ml. of dimethylformamide is refluxed for ten hours. The cooled reaction mixture is poured into water and extracted with toluene. The toluene layer is separated and evaporated in vacuo. The residue is heated on a steam bath with acetic anhydride for 30 minutes. Excess acetic anhydride is removed in vacuo and the residue is taken up in ether. The ether solution is extracted with aqueous hydrochloric acid. Evaporation of the ether layer gives 4-(N-acetyl - N- butyl)amino-3-n-hexyl-1,4-dihydropyrazolo[3,4-a]indene.

The aqueous acid extract is basified and extracted with ether. Evaporation of the ether gives, as the residue, 4-dibutylamino - 3 - n - hexyl - 1,4-dihydropyrazolo[3,4-a]indene.

Example 14

A mixture of 3.0 g. of 3-(3-butenyl)pyrazolo[3,4-a]inden-4(1H)-one (prepared by condensing dimethyl phthalate with 5-hexen-2-one and reacting the thus formed 2-(4-pentenoyl)-1,3-indandione with one equivalent of hydrazine) and 40 ml. of formamide is refluxed for 30 minutes. Cooling and filtering gives 3-(3-butenyl)-4-formamido-1,4-dihydropyrazolo[3,4-a]indene.

Refluxing this formamide with 3:1 hydrochloric acid for six hours and working up as in Example 13 gives 4-amino-3-(3-butenyl)1,4-dihydropyrazolo[3,4-a]indene.

Example 15

A mixture of 5.0 g. of 3-vinyl-6(and 7)-bromopyrazolo[3,4-a]inden-4(1H)-one (prepared by reacting dimethyl 4-bromophthalate with 3-butenone and treating the resulting product with one equivalent of hydrazine) and 60 ml. of formamide is heated at reflux for 60 minutes, then cooled and filtered to give 3-allyl-6(and 7)-bromo-4-formamido-1,4-dihydropyrazolo[3,4-a]indene.

Refluxing the above prepared isomers with hydrochloric acid for 30 minutes, basifying and removing the water layer gives 3-allyl-4-amino-(6 and 7)-bromo-1-, 4-dihydropyrazolo[3,4-a]indene.

These isomers are separated by dissolving in ether, treating with excess tartaric acid, filtering and fractionally crystallizing the tartrate salts from ethanol. The separated tartrate salts are converted to the free bases by dissolving in water, basifying, extracting with ether and evaporating the extracts.

Example 16

A mixture of 6.0 g. of 3-(5-hexenyl)-pyrazolo-[3,4-a]-inden-4(1H)-one (prepared by condensing dimethyl phthalate with 5-hexene methyl ketone and treating the resulting 2-(6-heptenoyl)-1,3-indandione with one equivalent of hydrazine) and 75 ml. of formamide is heated at reflux for 30 minutes to give, after cooling and filtering, 4-formamido-3-(5-hexenyl)-1,4-dihydropyrazolo[3,4-a]indene. Refluxing this compound with 3:1 hydrochloric acid, basifying and removing the aqueous layer gives 4-amino-3-(5-hexenyl)-1,4-dihydropyrazolo[3,4-a]-indene.

Example 17

A solution of 5.0 g. of 2-benzoyl-1,3-indandione, M.P. 109–110° C., and 1 g. of hydrazine hydrate in 200 ml. of ethanol is heated at reflux for 24 hours. Quenching gives a solid, 3-phenylpyrazolo[3,4-a]inden-4(1H)-one, M.P. 254–255° C.

A mixture of 3.5 g. of 3-phenylpyrazolo[3,4-a]inden-4(1H)-one and 40 ml. of formamide is heated at reflux for 30 minutes. Cooling and filtering gives 4-formamido-1,4-dihydro-3-phenylpyrazolo[3,4-a]indene which is refluxed with 25 ml. of 3:1 hydrochloric acid to give 4-amino-1,4-dihydro-3-phenylpyrazolo[3,4-a]indene.

An ether solution of the free base is treated with excess ethereal hydrogen chloride to give the dihydrochoride salt.

Example 18

A mixture of 2.0 g. of 3-p-aminophenylpyrazolo-[3,4-a]inden-4(1H)-one (prepared by condensing dimethyl phthalate with p-aminoacetophenone and reacting the resulting indandione with one equivalent of hydrazine) and 25 ml. of formamide is refluxed for 30 minutes. After cooling, 3-p-aminophenyl-4-formamido-1,4-dihydropyrazolo[3,4-a]indene is filtered off.

Refluxing this formamido compound with 25 ml. of 3:1 hydrochloric acid for five hours, then basifying and removing the aqueous layer gives 4-amino-3-p-aminophenyl-1,4-dihydropyrazolo[3,4-a]indene.

Example 19

A suspension of 0.666 mole (15.3 g.) of sodium in 250 ml. of toluene is heated with stirring until the sodium melts. After cooling to room temperature gradually with stirring, the toluene is removed and replaced by 300 ml.

of dry benzene. The mixture is stirred while 0.69 mole (22.0 g.) of dried methanol is slowly added. After reflux period of six hours, the excess methanol is removed. A mixture of 0.666 mole (129.2 g.) of dimethyl phthalate and 0.666 mole (100.0 g.) of p-methoxyacetophenone is added over a period of 30 minutes. Distillation of the reaction mixture is continued until the evolution of methanol stops. The mixture is cooled to separate a solid which is then removed and slurried in an aqueous-concentrated hydrochloric acid suspension. The resulting solid is recrystallized from tert-butanol to give 2-p-methoxybenzoyl-1,3-indanedione, M.P. 123–124° C.

A mixture of 0.1 mole (28.1 g.) of the indane-dione and 0.1 mole (5.0 g.) of hydrazine hydrate in 500 ml. of methanol is heated at reflux for 16 hours. The solution is cooled and diluted with 2 l. of cold water. The resulting solid is separated to give 3-p-methoxyphenyl-pyrazolo[3,4-a]inden-4(1H)-one, M.P. 264–265° C.

This ketone (8.0 g.) is refluxed with 100 ml. of formamide for 30 minutes. After cooling and filtering, 4-formamido - 1,4-dihydro-3-p-methoxyphenylpyrazolo[3,4-a]indene is obtained.

A mixture of 5.0 g. of this formamide is refluxed with 3:1 hydrochloric acid for five hours and worked up to give 4 - amino-1,4-dihydro-3-p-methoxyphenylpyrazole[3,4-a]indene.

Example 20

2-p-chlorobenzoyl - 5 - nitro-1,3-indandione, prepared by condensing dimethyl-4 - nitrophthalate with 4-chloro-acetophenone, is refluxed with one equivalent of hydrazine to give a mixture of 3-p-chlorophenyl-6(and 7)-nitro-pyrazolo[3,4-a]inden-4(1H)-one.

Refluxing this ketone (5.0 g.) with 60 ml. of formamide, cooling and filtering gives 3-p-chlorophenyl-4-formamido-1,4-dihydro-6(and 7) - nitropyrazolo[3,4-a]-indene which is refluxed with hydrochloric acid for five hours, basified and isolated from the aqueous layer to give 4-amino-3-p-chlorophenyl - 1,4-dihydro-6(and 7)-nitropyrazolo[3,4-a]indene.

These isomers are separated by converting to the citrate salts and fractionally crystallizing.

A mixture of 2.5 g. of 4-amino-3-p-chlorophenyl-1,4-dihydro - 6 - nitropyrazolo[3,4-a]indene in 10 ml. of pyridine and a solution of 3 equivalents of sodium hydrosulfite in 10 ml. of water is refluxed for 30 minutes. The mixture is quenched and extracted to give 4,6-diamino-3-p-chlorophenyl-1,4-dihydropyrazolo[3,4-a]indene.

Example 21

A mixture of 2.6 g. of 2-m-methylbenozoyl-1,3-indan-dione, prepared by condensing dimethyl phthalate with m-methylacetophenone, is heated with 0.5 g. of hydrazine hydrate for 10 hours in 200 ml. of ethanol. The resulting solid is 3-m-tolylpyrazolo[3,4-a]inden-4(1H)-one.

Four grams of 3-m-tolylpyrazolo[3,4-a]inden-4 - (1H)-one and 50 ml. of formamide are heated at reflux for 30 minutes to give, after cooling and filtering, 4-formamido-1,4-dihydro-3-m-tolylpyrazolo[3,4-a]indene.

Refluxing the above prepared formamide compound with 6.0 g. of lithium aluminum hydride in tetrahydro-furan solution for ten hours and working up as in Example 2 gives 1,4-dihydro-4-methylamino-3-m-tolylpyrazolo[3,4-a]indene.

Example 22

A mixture of 2.0 g. of 3-o-bromophenyl-6(and 7)-ethyl-pyrazolo[3,4-a]inden - 4(1H) - one (prepared by condensing dimethyl 4 - ethylphthalate with o-bromoaceto-phenone and refluxing the thus formed 2-o-bromobenzoyl-5-ethyl-1,3-indandione with one equivalent of hydrazine) and 25 ml. of formamide is refluxed for 30 minutes, then cooled and filtered to give 3-o-bromophenyl-6(and 7)-ethyl - 4 - formamido-1,4-dihydropyrazolo[3,4-a]indene.

Treating this formamido compound with hydrochloric acid gives a mixture of 3-o-bromophenyl-6-ethyl-4-form-amido-1,4 - dihydropyrazolo[3,4-a]indene and the corresponding 7-ethyl isomer.

These isomers are separated by fractional crystallization of the citrate salts from ethanol.

Example 23

A mixture of 5.0 g. of hydrazine hydrate and 21.6 g. of 2-isobutyryl-5-chloro-1,3-indandione, made by condensing 3-methyl-2-butanone with dimethyl 4-chlorophthalate, in 200 ml. of ethanol is refluxed for six hours. Cooling, adding water and filtering gives a mixture of 6(and 7)-chloro-3-isopropylpyrazolo[3,4-a]-inden-4(1H)-one.

Two grams of 6(and 7)-chloro-3-isopropylpyrazolo[3,4-a]inden-4(1H)-one is suspended in 30 ml. of formamide. The mixture is refluxed for 30 minutes, then cooled and filtered to give 6(and 7)-chloro-4-formamido-1,4-dihydro-3-isopropylpyrazolo[3,4-a]indene.

A mixture of 1.5 g. of 6(and 7)-chloro-4-formamido-1,4-dihydro-3-isopropylpyrazolo[3,4-a]indene and 20 ml. of 3:1 hydrochloric acid is heated at reflux for five hours. Basifying and removing the aqueous layer gives 4-amino-6(and 7)-chloro - 1,4-dihydro-3-isopropylpyrazolo[3,4-a]indene.

These isomers are separated by treating with a molar equivalent of maleic acid in ethyl acetate, fractionally crystallizing the resulting maleate salts from ethanol, dissolving the separated salts in water, neutralizing with sodium carbonate, extracting with ether and concentrating the extracts.

Example 24

A mixture of 2.5 g. of 4-amino-6(and 7)-chloro-1,4-dihydro - 3 - isopropylpyrazolo[3,4-a]indene, prepared as in Example 23, and 20 ml. of 10% sodium hydroxide is warmed for five minutes. The resulting salt is refluxed with one equivalent of benzenesulfonyl chloride in ether solution for ten minutes. Extraction with ether and evaporation of the extract gives a mixture of isomers 4-amino-1-benzenesulfonyl - 6(and 7)-chloro-1,4 - dihydro-3-iso-propylpyrazolo[3,4-a]indene.

Separation of these isomers is accomplished by fractional crystallization of the maleate salts.

Example 25

A mixture of 1.0 g. of 4-amino-1,4-dihydro-3-isopropyl-pyrazolo[3,4-a]indene, prepared as in Example 4, is converted to the potassium salt by heating with 5% potassium hydroxide. The resulting salt is heated with 0.8 g. of benzoyl chloride in benzene to give 4-amino-1-benzoyl-1,4 - dihydro - 3-isopropylpyrazolo[3,4-a]indene.

Similarly by reacting the potassium salt of 4-amino-1,4-dihydro-3 - isopropylpyrazolo[3,4-a]indene prepared as above with one equivalent acetyl chloride in ether suspension gives upon extraction with ether and evaporation of the volatiles 1-acetyl-4-amino-1,4-dihydro - 3-isopropyl-pyrazolo[3,4-a]indene.

The hydrochloride salt is obtained by reacting an ethanol solution of the free base with excess ethereal hydrogen chloride.

Example 26

The potassium salt of 4-amino-1,4-dihydro-3-isopropyl-pyrazolo[3,4-a]indene (1.2 g.), prepared as in Example 25, in refluxed with 0.5 g. of propionyl chloride in benzene for 30 minutes. Extraction with ether and evaporation of the extracts gives 4-amino-1,4-dihydro-3-isopropyl-1-propionylpyrazolo[3,4-a]indene.

Example 27

A mixture of 3-n-butyl-5-methoxypyrazolo[3,4-a]inden-4 (1H)-one and the corresponding 8-methoxy isomer is prepared by condensing dimethyl 3-methoxyphthalate with 2-hexanone and reacting the resulting 4-methoxy-2-valeryl-1,3-indandione with one equivalent of hydrazine.

These isomers (8.0 g.) are heated at reflux with 100 ml. of formamide to give, after cooling and filtering, 3-n- butyl-4-formamido-1,4-dihydro-5(and 8)-methoxypyrazolo[3,4-a]indene.

A mixture of these formamido isomers is refluxed with 40 ml. of 3:1 hydrochloric acid to give 4-amino-3-n-butyl-1,4-dihydro-5(and 8)-methoxypyrazolo[3,4-a]indene. These isomers are separated by fractional crystallization of the maleate salts.

Example 28

A mixture of 2.5 g. of 4-amino-3-n-butyl-1,4-dihydro-5-methoxypyrazolo[3,4-a]indene (prepared as in Example 27), 0.8 g. of acetyl chloride, 1.1 g. of sodium carbonate and 25 ml. of benzene is refluxed for two hours. Cooling, filtering, washing with water, extracting with ether and distilling the ether from the extracts gives 4-acetamido-3-n-butyl-1,4-dihydro-5-methoxypyrazolo-[3,4-a]indene.

Similarly, refluxing 2.5 g. of 4-amino-3-n-butyl-1,4-dihydro-5-methoxypyrazolo[3,4-a]indene with 1.0 g. of propionyl chloride in benzene in the presence of sodium carbonate gives 3-n-butyl-1,4-dihydro-5-methoxy-4-propionamidopyrazolo[3,4-a]indene.

Example 29

A mixture of 3.0 g. of 4-amino-3-t-butyl-1,4-dihydro-6-trifluoromethylpyrazolo[3,4-a]indene (prepared as in Example 5) and 1.4 g. of benzoyl chloride in 50 ml. of benzene is heated at reflux for four hours. Concentrating, basifying with sodium carbonate, extracting with ether and evaporating the extracts gives 4-benzamido-3-t-butyl-1,4-dihydro-6-trifluoromethylpyrazolo[3,4-a]indene.

Example 30

A mixture of 2.1 g. of 4-amino-3-cyclopropyl-1,4-dihydropyrazolo[3,4-a]indene (prepared as in Example 6), 1.8 g. of benzenesulfonyl chloride and 25 ml. of ether is refluxed for two hours. Evaporation of the mixture, treatment of the residue with excess aqueous sodium carbonate, extraction with ether and evaporation of the extracts gives 4-benzenesulfonamido-3-cyclopropyl-1,4-dihydropyrazolo[3,4-a]indene.

Example 31

A mixture of 3.0 g. of 4-amino-3-ethyl-1,4-dihydropyrazolo[3,4-a]indene (prepared as in Example 1), 1.0 g. of methyl chloroformate and 25 ml. of ether is refluxed for one hour. Concentrating, treating with aqueous sodium carbonate, extracting with ether and evaporating the extracts gives 3-ethyl-1,4-dihydro-4-carbomethoxyaminopyrazolo[3,4-a]indene.

Similarly treating 4-amino-3-ethyl-1,4-dihydropyrazolo[3,4-a]indene with ethyl chloroformate yields 4-carbethoxyamino-3-ethyl 1,4-dihydropyrazolo[3,4-a]indene.

Example 32

A mixture of 2.0 g. of 4-amino-3-ethyl-1,4-dihydropyrazolo[3,4-a]indene, prepared as in Example 1, 0.8 g. of carbamoyl chloride and 25 ml. of anhydrous ether is refluxed for one hour. Evaporation of the volatiles leaves 3-ethyl-1,4-dihydro-4-ureidopyrazolo[3,4-a]indene.

Example 33

A mixture of 2.2 g. of 4-amino-3-ethyl-1,4-dihydropyrazolo[3,4-a]indene, made as in Example 1, and 20 ml. of 10% sodium hydroxide is warmed for five minutes. The resulting sodium salt is warmed with 0.8 g. of carbamoyl chloride in anhydrous ether for one hour. Evaporation of the volatile material leaves 4-amino-1-carbamoyl-3-ethyl-1,4-dihydropyrazolo[3,4-a]indene.

What is claimed is:

1. A chemical compound of the class consisting of a free base and its nontoxic, pharmaceutically acceptable acid addition salts, the free base having the formula:

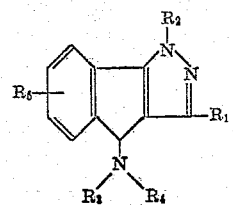

in which $R_1$ is a member selected from the group consisting of alkyl of from 1 to 6 carbon atoms inclusive, alkenyl of from 2 to 6 carbon atoms inclusive, cycloalkyl of from 3 to 6 carbon atoms inclusive, cycloalkenyl of from 4 to 6 carbon atoms inclusive, phenyl, aminophenyl, halophenyl, lower alkylphenyl and lower alkoxyphenyl; $R_2$, $R_3$ and $R_4$ are members selected from the group consisting of hydrogen, lower alkyl, benzoyl, benzenesulfonyl formyl, acetyl, propionyl, carbethoxy, carbomethoxy, and carbamoyl; and $R_5$ is a member selected from the group consisting of hydrogen, halogen, trifluoromethyl, lower alkyl, lower alkoxy, hydroxy, nitro and amino.

2. A compound having the following formula:

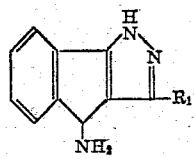

in which $R_1$ is alkyl of from 1 to 8 carbon atoms.

3. A compound having the following formula:

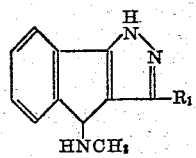

in which $R_1$ is alkyl of from 1 to 8 carbon atoms.

4. A compound having the following formula:

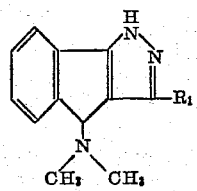

in which $R_1$ is alkyl of from 1 to 8 carbon atoms.

No references cited.